Patented Nov. 25, 1924.

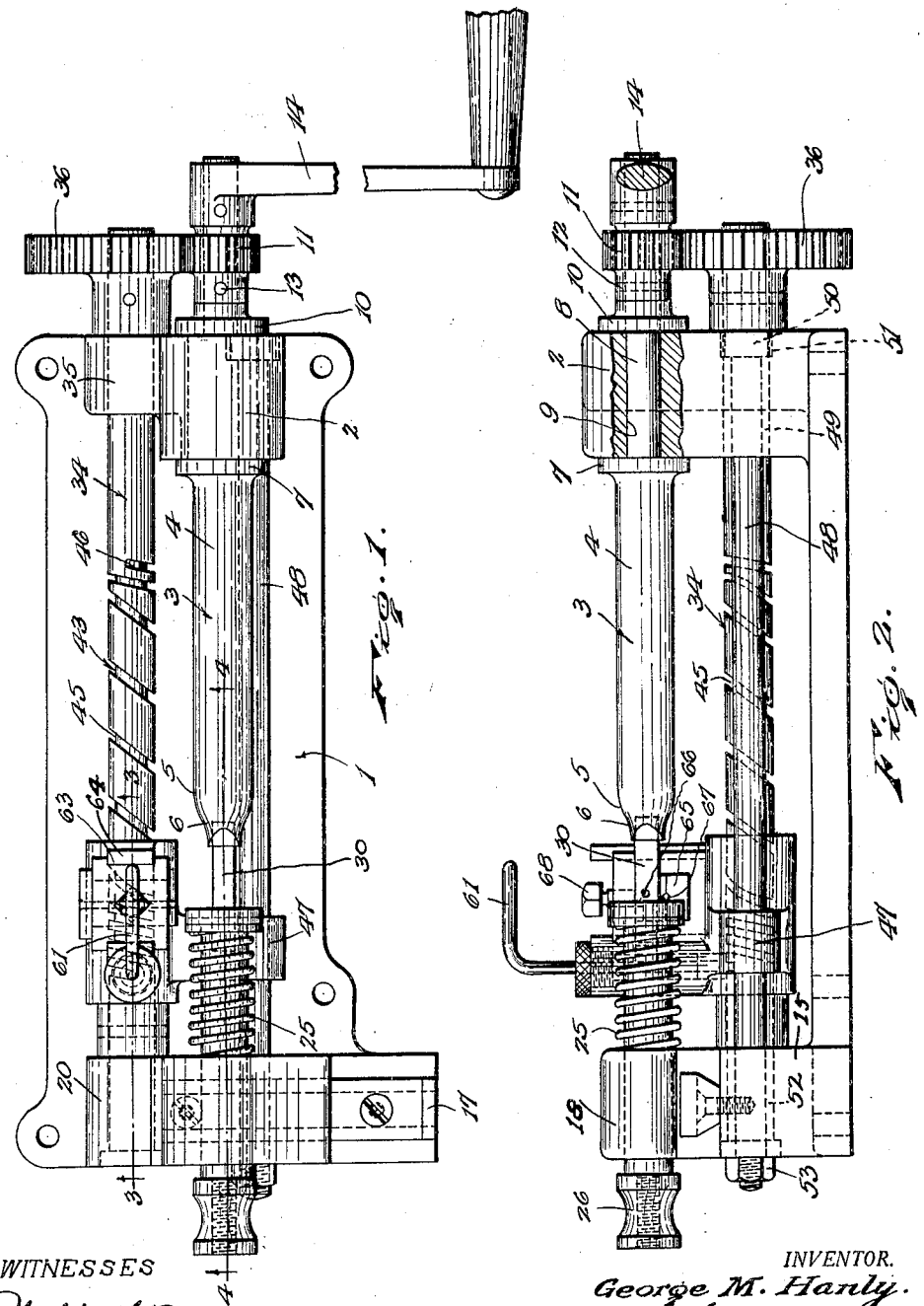

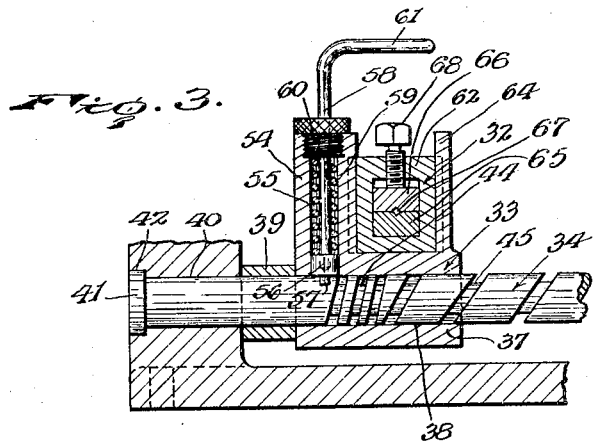
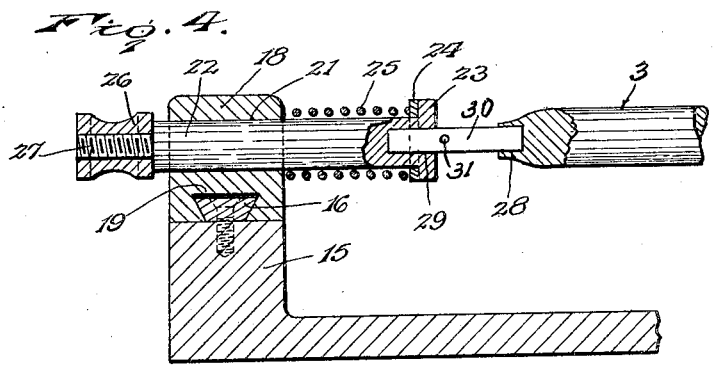
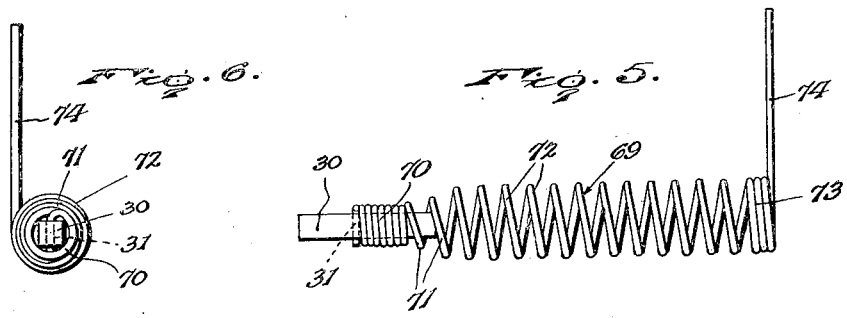

1,517,004

UNITED STATES PATENT OFFICE.

GEORGE M. HANLY, OF TIFFIN, OHIO, ASSIGNOR OF ONE-THIRD TO JOHN V. HERSH-BERGER, OF TOLEDO, OHIO.

SPRING-WINDING MACHINE.

Application filed May 31, 1923. Serial No. 642,683.

*To all whom it may concern:*

Be it known, that I, GEORGE M. HANLY, a citizen of the United States, residing at Tiffin, in the county of Seneca and State of Ohio, have invented certain new and useful Improvements in Spring-Winding Machines, of which the following is a specification.

This invention relates to an improvement in machines for forming coiled wire springs and has as its general object to provide a machine by the use of which coiled springs of any desired shape and size may be readily and economically formed.

One of the primary objects of the present invention is to provide means, in a machine for the purpose stated, whereby a spring having its coils or helices variously spaced may be formed with the same degree of facility and accuracy as a spring having uniformly spaced coils.

Another object of the invention is to provide novel means whereby, by the mere interchange of one part of the machine, springs of different characteristics may be produced, and having their coils differently spaced or formed.

Another object of the invention is to so construct the machine that the wire stock from which the spring is to be formed may be readily initially engaged, and the completed spring has readily removed from the machine after its formation, the required adjustment of the parts to again take up the stock to form another spring being capable of being effected in an expeditious and convenient manner.

In the accompanying drawings:

Fig. 1 is a plan view of the machine embodying the invention, the parts being shown in the positions which they will assume substantially at the beginning of the forming operation;

Fig. 2 is a side elevation of the machine with the parts in the position stated;

Fig. 3 is a vertical longitudinal sectional view taken substantially on the line 3—3 of Fig. 1;

Fig. 4 is a similar view taken substantially on the line 4—4 of Fig. 1;

Fig. 5 is a side elevation of a spring produced through the operation of the machine;

Fig. 6 is an end view of the said spring.

The machine embodying the invention comprises a base 1 which is adapted to be secured upon any suitable support such for example as a work bench, and which base may constitute an integral casting, being provided at one end with an integral upstanding bearing head indicated by the numeral 2. The spring to be produced by operation of the machine is to be formed upon a mandrel which is indicated in general by the numeral 3 and this mandrel comprises a body portion 4 which in the present instance is substantially cylindrical throughout its length except at one end where it is rounded as at 5 and somewhat tapered as at 6. The mandrel is formed at the opposite end of its body 4 with a circumscribing shoulder 7 which abuts against one side of the bearing head 2, and it is provided with a reduced spindle portion 8 which is rotatably journalled in a bearing opening 9 formed in the said head 2. A collar 10 is fitted onto the reduced portion of the mandrel and rests against the other side of the bearing head 2, and a pinion 11 has a hub portion 12 fitted onto the reduced spindle portion 8 of the mandrel and secured for rotation therewith by a transverse pin or key 13. A crank handle 14 is similarly secured to the end of the spindle portion 8, and it will be evident that by operating the crank handle 14, rotary motion will be imparted to the mandrel and to the pinion 11.

The base 1 is provided at its end opposite the end at which the bearing head 2 is located, with an upstanding boss 15, upon the upper side of which is formed or secured a dove-tailed rib 16 having at one end an upstanding abutment lug 17. The numeral 18 indicates a bearing head having a dove-tailed groove 19 formed in its under side to accommodate the rib 16, and in this manner the said head 18 is supported upon the base for backward and forward adjustment, its movement in one direction being limited by the abutment lug 17 and in the opposite direction by an upstanding portion 20 of the boss 15. The bearing head 18 is provided with a bearing opening 21 in which is freely rotatably and slidably mounted a chuck shank 22. The chuck is presented endwise to the mandrel 3 and is provided at its end which is next adjacent the mandrel with a circumscribing shoulder or enlargement 23 against which is disposed a washer 24. A coiled spring 25 is fitted onto the shank of the chuck and bears at one end against the washer 24 and at its other end against the bearing head 18. A finger knob 26 is removably fitted onto a reduced threaded portion 27 formed at the other end of the chuck shank and, by abutment against the bearing head 18, is designed to limit the movement of the chuck shank in one direction, it being understood that the spring 25 constitutes means for yieldably holding the said chuck in the direction of the mandrel 3. The adjacent ends of the mandrel and the chuck are formed with polygonal sockets indicated respectively by the numerals 28 and 29, and these sockets are designed to receive the end of a core pin 30 which is preferably of rectangular cross section as illustrated in the drawings, although it may assume some other polygonal form if found desirable. By reference to Figs. 1, 2 and 4 of the drawings it will be evident that when the core pin 30 is properly positioned, it will engage at its ends in the sockets 28 and 29 in the mandrel 3 and the chuck 22, such engagement being effected by pulling back upon the chuck 22 against the tension of the spring 25, and then inserting one end of the core pin into the socket 28, the chuck being then released so that it will be moved toward the mandrel under the influence of the spring 25 to engage the other end of the said core pin. For a purpose to be presently described, the core pin 30 is provided with a transverse opening 31 located at a point suitably spaced from its end.

The wire stock from which the spring is to be made is led through a tensioning device before being wound upon the mandrel 3, and this device is indicated in general in the drawings by the numeral 32. The tensioning device is supported upon a follower indicated in general by the numeral 33, and this follower is in turn supported upon a shaft 34. The shaft 34 is journaled at one end, for rotation, in a bearing 35 provided in the bearing head 2 and fixed upon this end of the shaft is a gear 36 which is in mesh with the pinion 11 so that rotary motion of the mandrel 3, which is effected through rotation of the crank handle 14, will result in rotary motion of the said shaft 34. The follower comprises a sleeve portion 37 having a bore 38 of a diameter to snugly receive the shaft 34 so that the sleeve may slide along the shaft and the movement of the sleeve in one direction, namely in the direction of the upstanding portion 20 of the boss 15, is limited by a collar 39 which is fitted onto the said shaft 34 and against which the sleeve 37 is designed to abut as clearly shown in Fig. 3 of the drawings, the collar in turn abutting against the said upstanding portion 20 of the boss. The adjacent end of the shaft 34 is journaled as at 40 in the said portion 20 of the boss, and this end of the shaft is provided wth a circular enlargement 41 which rotatably seats in a recess 42 formed in the outer face of the boss. The shaft 34 is formed with a thread indicated in general by the numeral 43, and this thread may take different forms. In the structure illustrated in the drawings, the several helices of the thread, indicated specifically by the numeral 44, are extended on a helical line and in the present instance are three in number although they may be of a greater or less number. From the helices 44, the thread is extended on a spiral line about the shaft as indicated by the numeral 45, and likewise these helices 45 may be of any desired number, and their pitch may be varied. At its opposite end, the thread 43 is again returned to helical form as indicated by the numeral 46, these helices being likewise of any desired number and of any desired pitch. In the illustrated embodiment, the helices 45 are of greater pitch than the helices 44 and 46, and the purpose of thus varying the pitch of the several groups of helices will presently be made clear, in the description of operation of the machine which is to follow. The sleeve 37 of the follower 33 is provided with an extension 47 formed with a bearing opening through which extends a guide rod 48 one end of which rod is fitted through an opening 49 in the bearing head 2 and is provided with a head 50 which seats in a recess 51 formed in said head 2. The other end of the guide rod 48 extends through an opening 52 formed in the boss 15, and this end of the rod is threaded to accommodate a nut 53 which may be tightened to bear against the said boss so as to rigidly secure the rod 48 in place, it being understood that the slidable engagement of the extension 47 with the rod 48 serves to maintain the follower 33 in upright position upon the shaft 34 and guide the same in its movement longitudinally of the shaft.

In order to effect feeding of the follower 33 longitudinally of the shaft 34, means is provided which will now be described. The follower 33 is provided with an upstanding tubular extension 54, the bore of which is indicated by the numeral 55. This bore opens at its lower end into the bore 38 of the sleeve portion 37 of the said follower and slidably receives a cylindrical head 56 which is provided upon its under side with a stud 57 seating in the threads 43. A stem 58 is threaded at its lower end into the head 56 and extends upwardly through the bore 55, and a spring 59 is arranged within the bore and about the said stem and bears at one end against the head 56 and at its other end against a cap screw 60 which is threaded into the upper end of the bore, the said cap screw being provided with an opening slidably receiving the stem 58, and the stem being provided at its upper end with a laterally turned finger piece 61, which may be grasped for the purpose of elevating the stem and consequently the head 56 against the tension of the spring 59 and to retract the stud 57 from the threads 43.

The tensioning device 32, heretofore referred to, comprises a rectangular hollow block 62 which is provided in its opposite sides with recesses or grooves 63 which slidably fit upstanding guide portions 64 upon the follower 33, the block being in this manner supported between the guides for vertical movement. Tensioning blocks 65 and 66 are mounted within the block 62 and are provided in their meeting faces with channels 67 which match so as to provide an opening through which the wire, from which the spring is to be made, is drawn and tensioned, a tensioning screw 68 being threaded through the upper end of the block 62 and being adjustable to bind against the block 66 to suitably tension the said wire.

Figs. 5 and 6 of the drawings illustrate the spring which will be produced through operation of the machine as constructed in Figs. 1 to 4, inclusive, that is to say, assuming that the threads 43 in the shaft 34 are of the contour illustrated in the several figures, and the said spring, which is indicated in general by the numeral 69, comprises a number of coils or helices 70 which are formed in close contact with one another and of relatively small diameter, other helices 71 which are of gradually increasing diameter and extend beyond the helices 70, a series of helices 72 which are of substantially uniform diameter and more or less equidistantly spaced with relation to one another, and, finally, a plurality of helices 73 which are formed close to one another and are of substantially the same diameter as the helices 72. In the operation of the machine, to form the spring shown in the said Figs. 5 and 6, the core pin 30 is first inserted at its ends into the sockets 28 and 29, and one end of the wire from the stock is inserted through the opening formed by the channels 67 in the tensioning device, and the tensioning screw 68 is adjusted so as to more or less firmly bind the wire and thus offer the required resistance to its being drawn through the said opening, and placing it under a desired degree of tension. The end of the wire is fitted through the opening 31 in the core pin 30 and it will be understood that in doing this the tensioning device comprising the block 62 may be elevated between the guides 64 so as to properly aline the opening 67 with the opening 31. With the parts in the positions shown in Figs. 1, 2 and 3 of the drawings, the crank handle 14 is now rotated and through this medium the mandrel 4 and shaft 34 are set in operation. As the mandrel is rotated, the core pin 30 will likewise be rotated, and the endmost portion of the wire from the stock will be wound about the core pin to form the helices 70, the stud 57 traveling, in the meantime, in the threads 44 of the shaft 34, and the follower 33 and tensioning device associated therewith being, due to the gradual pitch of these threads, slowly fed longitudinally of the said shaft 34 and parallel to the mandrel 4. In the continued rotation of the crank handle and the mandrel and shaft, the stud 57 will enter and coact with the helices 45 so that the follower will be fed less gradually along the shaft 34. The wire, at this time, and, more specifically speaking, while the stud 57 is passing from the helices 44 to the helices 45, will be wound about the tapered portion 6 and rounded portion 5 of the mandrel 4 to form the helices 71. When the stud 57 has actually passed from the helices 44 to the helices 45, the follower 33 will then be advanced at a substantially constant rate of speed so that the wire will be guided and wound about the body portion of the mandrel to form the helices 72. As the stud 57 leaves the helices 45 and enters the helices 46 of the shaft 34, which latter helices are of gradual pitch, the follower will again be somewhat retarded in its longitudinal movement and as a consequence the helices 73 will be formed lying close to or in direct contact with one another. By this time the stud 57 will have reached the end of the threads 43 and the operation of the machine will be stopped. The wire is then cut at a point adjacent to the tensioning device 32, thus leaving an extended end portion 74 which may or may not constitute a permanent part of the spring, depending upon the use to which the spring is to be put. The pin 58 is now elevated by grasping the finger piece 61, thus retracting the stud 57 from engagement in the threads 43, and the follower 33 is shifted back along the shaft 34 to its initial position, and the pin is then released to permit the stud to engage in the end of the helices 44 after which operation of the machine may be repeated.

In removing the completed spring from the mandrel 4, it is only necessary to first retract the chuck 22 against the tension of the spring 25 to release the engaged end of the core pin 30, and then shift the bearing head 18 forwardly to bring the same and the chuck out of alinement with the mandrel whereupon the spring and core pin may be slipped off from the mandrel. A reverse operation is, of course, followed in placing a new core pin in position for the winding of a new spring.

As previously stated, by the mere interchange of one part of the machine, springs of different characteristics may be produced, and having their coils differently spaced or formed. This is effected by employing a required number of the shafts 34 each having a different arrangement of feed threads, and by dismounting the shaft which is at that time in the machine, another shaft having the required form of threads to form the type of spring desired, may be selected and substituted for the removed shaft.

Having thus described the invention, what is claimed as new is:

1. In spring winding mechanism, a rotary mandrel, means for rotating the same, a rotary shaft having a thread different portions of which are of different pitch, a follower having means coacting with the thread of the shaft to effect movement of the follower longitudinally with relation to the mandrel, means for imparting rotary motion to the shaft, and wire guiding means movable with the follower, the said wire guiding means being likewise freely movable in a direction transverse to the axis of the mandrel whereby to permit the wire to follow the contour of the mandrel.

2. In spring winding mechanism, a rotary mandrel, means for rotating the same, the said mandrel having portions of different diameters, a rotary shaft having a thread, a follower having means coacting with the thread of the shaft to effect movement of the follower longitudinally with relation to the mandrel, means for imparting rotary motion to the shaft, and wire guiding means movable with the follower and likewise movable in a direction transverse to the axis of the mandrel whereby to permit the wire to follow the contour of the mandrel.

3. In spring winding mechanism, a rotary mandrel having a polygonal socket in its end, a chuck opposing the mandrel in endwise relation thereto and having a polygonal socket, a core pin of polygonal cross sectional contour removably seated at its ends in the said sockets in the mandrel and chuck and having an opening to receive the terminal of a length of wire from which the spring is to be formed, means for imparting rotary motion to the mandrel and core pin and chuck, and means for guiding the wire along the mandrel in the rotation of the latter.

4. In spring winding mechanism, a rotary mandrel, means for rotating the same, the mandrel having a polygonal socket in its end, a support movable transversely with relation to the axis of the mandrel and confronting the socketed end thereof, a chuck mounted upon the said shiftable member and, in one position of adjustment of the member, being in axial alinement with the mandrel, the said chuck having a polygonal socket, a core pin of polygonal cross sectional form seated removably at its ends, in said sockets, and provided with means adapting it for attachment thereto to the terminal of a length of wire from which the spring is to be formed, and means for feeding a wire along the mandrel.

5. In spring winding mechanism, a rotary mandrel, means for rotating the same, the mandrel having a polygonal socket in its end, a member shiftable transversely with relation to the axis of the mandrel and confronting the socketed end thereof, a chuck mounted upon the said shiftable member and, in one position of adjustment of the member, being in axial alinement with the mandrel, the said chuck having a polygonal socket, a core pin of polygonal cross sectional form seated removably at its ends in said sockets and provided with means adapting it for attachment thereto to the terminal of a length of wire from which the spring is to be formed, and means for feeding a wire along the mandrel and actuated through operation of the rotating means for the mandrel.

6. In spring winding mechanism, a rotary mandrel, means for rotating the mandrel, a support movable transversely of the axis of the mandrel, a chuck slidably mounted in the support, a spring yieldably holding the chuck shifted in the direction of the mandrel, a core pin removably supported by the opposing ends of the mandrel and chuck and having means for the connection therewith of the terminal of a length of wire from which the spring is to be formed, and means operating in consonance with the rotation of the mandrel to feed the said length of wire longitudinally along the mandrel as it is wound thereon.

In testimony whereof I affix my signature.

GEORGE M. HANLY. [L. S.]